Jan. 1, 1952  A. M. SKELLETT  2,581,305
DETECTION OF ELECTRICALLY CHARGED PARTICLES
Filed Sept. 15, 1943

INVENTOR
A. M. SKELLETT
BY
Walter C. Kiesel
ATTORNEY

Patented Jan. 1, 1952

2,581,305

UNITED STATES PATENT OFFICE 2,581,305

DETECTION OF ELECTRICALLY CHARGED PARTICLES

Albert M. Skellett, Madison, N. J., assignor to Bell Telephone Laboratories, Incorporated, New York, N. Y., a corporation of New York Application September 15, 1943, Serial No. 502,486

6 Claims. (Cl. 250—83.6)

This invention relates to the detection of electrically charged particles and more particularly to electronic apparatus for detecting beta, gamma, X and cosmic rays and the like.

One object of this invention is to increase the sensitivity of detectors of high energy rays or particles.

Another object is to obtain a sensitive detector of these particles without employing a high direct current voltage.

In one illustrative embodiment of this invention, a detector of high energy rays or particles, such as, for example, high velocity electrons, comprises a vessel permeable to the rays or particles and having an ionizable medium, such as a gas, therein, a pair of electrodes within the vessel and spaced in proximity to define a gap, and means for establishing a potential difference between the electrodes less than that necessary to initiate a discharge across the gap. The vessel is exposed to the field in which the rays to be detected are to be found so that when such rays enter the gap, the energy thereof may be utilized to create a discharge between the electrodes and provide an indication of the presence or energy of the rays.

In a specific embodiment of the invention, the electrodes are connected across a high impedance point of a high Q, high frequency circuit energized at a frequency in either the kilocycle or megacycle range as by a suitable oscillator. When a charged particle of high energy enters the gap between the electrodes, it effects ionization of the ionizable medium. For example, high velocity electrons projected into the gap result in the establishment of ionized atoms and free electrons in the gap. The free electrons, under the influence of the high frequency field extant between the electrodes, oscillate, and, by collisions with the gas molecules, cause release of other electrons which oscillate and act in like manner. The medium between the electrodes thus becomes ionized rapidly; the impedeance across the gap is reduced and the potential across the gap falls off suddenly. An indicating device associated with the high frequency circuit responds to the sudden reduction in the potential.

Figure 1:
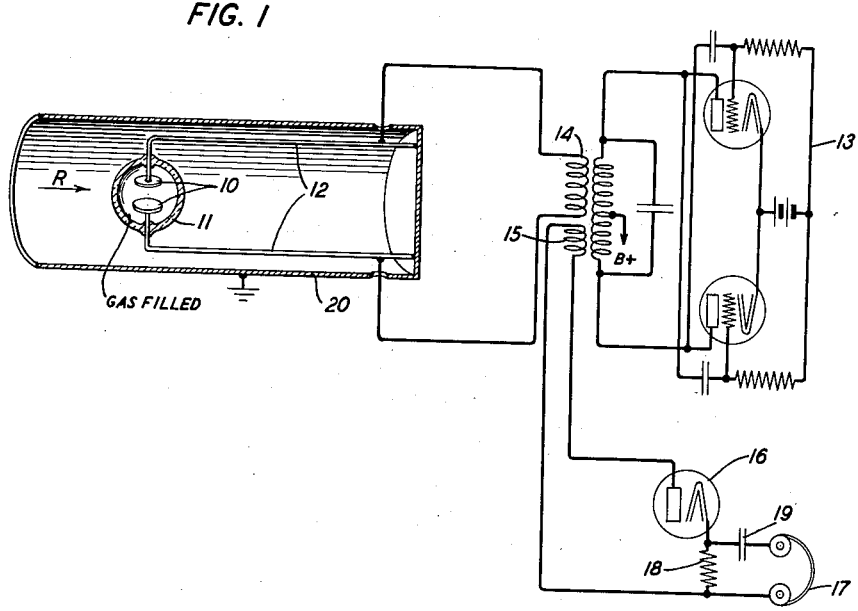
Figure 2:
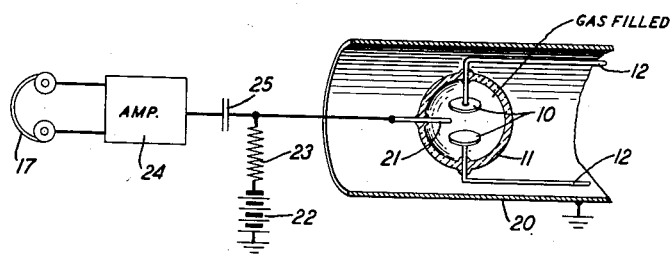

The invention and the features thereof will be understood more clearly and fully from the following detailed description with reference to the accompanying drawing, in which:

Fig. 1 is a diagram of an electronic detector of high energy rays or particles, illustrative of one embodiment of this invention; and Fig. 2 is a diagram illustrating a modification of the detector shown in Fig. 1.

Referring now to the drawing, the detector illustrated in Fig. 1 comprises a pair of electrodes 10 mounted in juxtaposition within a vessel 11 permeable to the rays to be detected and having an ionizable medium therein, for example a filling of hydrogen at a pressure of the order of one centimeter of mercury. The electrodes 10 are connected across a high impedance portion of a high Q circuit resonant at a prescribed frequency. Such circuit, in the form disclosed in Fig. 1, may comprise a pair of parallel conductors 12 within a grounded shield 20, the conductors being connected to the shield at one end and one-quarter wavelength, or an odd number of quarter wavelengths, of the prescribed frequency long, and the electrodes 10 being bridged across the other end of the conductors.

The high frequency circuit is energized as by a push-pull oscillator 13 to which it is coupled by a coil 14. The operating frequency may be in the megacycle range, e. g. 500 megacycles, if electrons are employed as the ionizing element in the housing 11, or may be in the kilocycle range if ions are utilized to initiate ionization in the housing 11. In either case, the parameters of the system are correlated so that the amplitude of the high frequency potential impressed between the electrodes 10 is below that necessary to initiate a discharge between the electrodes, that is, below the breakdown potential of the gap between the electrodes.

Coupled to the coil 14 is a pick-up coil 15 which is in circuit with a diode detector 16 and an indicating device 17, such as a telephone receiver, connected across the output resistor 18 through a suitable condenser 19.

The operation of the apparatus will be understood from the following considerations. Normally, as noted hereinabove, the alternating potential across the gap between the electrodes 10 is below that requisite to initiate a discharge and the impedance across the gap is high. When a high velocity electron, as in a ray indicated by the arrow R, enters the gap between the electrodes 10, it causes ionization of the medium in the vessel 11 and free electrons are produced. These electrons oscillate in the gap due to the high frequency field between the electrodes 10, colliding with gas atoms in the course of the oscillations and thus result in the release of other electrons. The latter oscillate in like manner to produce still other electrons. The process is repeated and cumulative in effect so that very quickly the gap is filled with ionized gas sufficient to establish a discharge between the electrodes 10. When such discharge occurs, the impedance of the gap is decreased and the radio frequency potential across the gap is reduced greatly and abruptly. Consequently, the load on the oscillator changes abruptly and a pulse indicative of the change is impressed upon the detector 16 by way of the pick-up coil 15 so that a click is heard in the receiver 17.

When the discharge occurs, the high frequency energy available for affecting the electrons in the gap is insufficient to sustain the discharge. Consequently, the electrons and ions drift to the electrodes, the discharge ceases and the device is restored to its initial condition. Because of the high Q of the circuit, an appreciable time is necessary for the radio frequency voltage across the gap to increase to the critical value requisite to maintain a discharge so that the return of the device to its initial non-ionized state can be effected.

Although in the foregoing description an electron projected into the gap has been considered as the agent initiating operation of the detector, it is apparent that a similar action will result from the passage of gamma and cosmic rays and the like into the gap inasmuch as such rays will cause the establishment in the gap of ionized atoms and free electrons. Also, as indicated heretofore, the operating frequency may be in the kilocycle range and ions instead of electrons caused to oscillate in the gap to produce ion, instead of electron, multiplication and consequent initiation of the discharge between the electrodes 10.

It may be noted that two modes of operation are possible. At potentials between the electrodes 10 below that requisite to effect breakdown of the gap, the amplification factor of the device as a function of the potential increases gradually through a range of low potentials and then is substantially constant throughout a range of higher potentials up to the breakdown potential. Hence, if the high frequency potential impressed between the electrodes 10 is within the range of low potentials, the output voltage obtained from the pick-up coil 15 will be proportional to the energy of the particle or ray passing into the gap between the electrodes. If this high frequency potential is in the range wherein the amplification factor is substantially constant, the output voltage obtained will be substantially independent of the energy of the particle or ray detected.

In a modification of the detector illustrated in Fig. 1 and described hereinabove, means may be provided for producing in the gap between the electrodes 10 a steady magnetic field having its lines of force normal to the axis of alignment of the electrodes and of such intensity as to establish resonance of the electron oscillations. The provision of such a field increases the sensitivity of the detector.

In another modification illustrated in Fig. 2, an auxiliary electrode 21, for example in the form of a rod, is provided adjacent the main electrodes 10 and is utilized as a collector for either electrons or ions. The auxiliary electrode is maintained at a suitable potential, positive if utilized as an electron collector and negative if utilized as an ion collector, as by a battery 22 in series with an output resistor 23, and is connected to the input of an amplifier 24 by way of a condenser 25. An indicating element 17, such as a telephone receiver, is connected to the output of the amplifier. The operation of the device illustrated in Fig. 2 is the same as that of the device illustrated in Fig. 1, except, of course, that the output signal is obtained by way of the collector electrode 21. As in the device illustrated in Fig. 1, the device illustrated in Fig. 2 may be operated to provide an output either proportional to or substantially independent of the energy of the ray or particle detected.

Although specific embodiments of the invention have been shown and described, it will be understood that they are but illustrative and that various modifications may be made therein without departing from the scope and spirit of this invention as defined in the appended claims. For example, although the high frequency circuit has been illustrated in the form of a shielded pair transmission line, it may be in the form of a cavity resonator, a coaxial conductor transmission line, or simply a coil coupled to the oscillator.

What is claimed is:

1. An electronic detector comprising a vessel permeable to high energy rays and having an ionizable medium therein, a pair of electrodes within said vessel and spaced to define a discharge gap, a high frequency circuit, said electrodes being connected across a high impedance portion of said circuit, means for energizing said circuit to establish between said electrodes a high frequency potential difference below the breakdown potential of said gap, and indicating means responsive to ionization of said medium.

2. A detector of high energy rays or particles comprising a vessel permeable to such rays or particles and having a gaseous filling, a high frequency circuit, a pair of electrodes within said vessel defining a discharge gap and connected across a high impedance portion of said circuit, means for energizing said circuit at a frequency in the megacycle range to establish between said electrodes a potential difference less than the breakdown potential of said gap, and indicating means responsive to ionization of said gaseous filling.

3. A detector of high energy rays or particles comprising a vessel permeable to such rays or particles and having an ionizable medium therein, a pair of electrodes within said vessel and defining a discharge gap, a high frequency circuit, said electrodes being connected across a high impedance portion of said circuit, an oscillator coupled to said circuit for establishing between said electrodes a high frequency potential difference below the breakdown potential of said gap, and indicating means coupled to said circuit and responsive to ionization of said medium.

4. A detector of high energy rays or particles comprising a vessel permeable to such rays or particles and having an ionizable medium therein, a high frequency circuit, a pair of main electrodes within said vessel, defining a gap and connected across a high impedance portion of said circuit, means for energizing said circuit to establish between said electrodes a high frequency potential difference below the breakdown potential of said gap, a collector electrode within said vessel, and indicating means connected to said collector electrode.

5. A detector of high energy rays or particles comprising a vessel permeable to such rays or particles and having an ionizable medium therein, a pair of electrodes within said vessel and defining a discharge gap, a shielded pair transmission line, means for supplying radio frequency power to said line, said electrodes being bridged across a high impedance portion of said line and said means establishing a potential difference between said electrodes below the breakdown potential of said gap, and indicating means responsive to ionization of said medium.

6. The method of detecting high energy rays which comprises establishing across a discharge gap in a medium directly ionizable by entrance of a high energy ray thereinto a radio frequency potential below the breakdown potential of said gap, exposing said gap to the rays to be detected for ionization of said medium independent of electron emission from the members defining said gap, by high energy rays, and detecting ionization of said medium by the rays.

ALBERT M. SKELLETT.

REFERENCES CITED

The following references are of record in the file of this patent:

UNITED STATES PATENTS

| Number | Name | Date |
|---|---|---|
| 625,823 | Zickler | May 30, 1899 |
| 1,533,730 | Engler | Apr. 14, 1925 |
| 1,736,993 | Breisky | Nov. 26, 1929 |
| 1,837,364 | Ives | Dec. 22, 1931 |
| 1,980,198 | Gray | Nov. 13, 1934 |
| 2,123,242 | Hollmann | July 12, 1938 |